Figure 1:
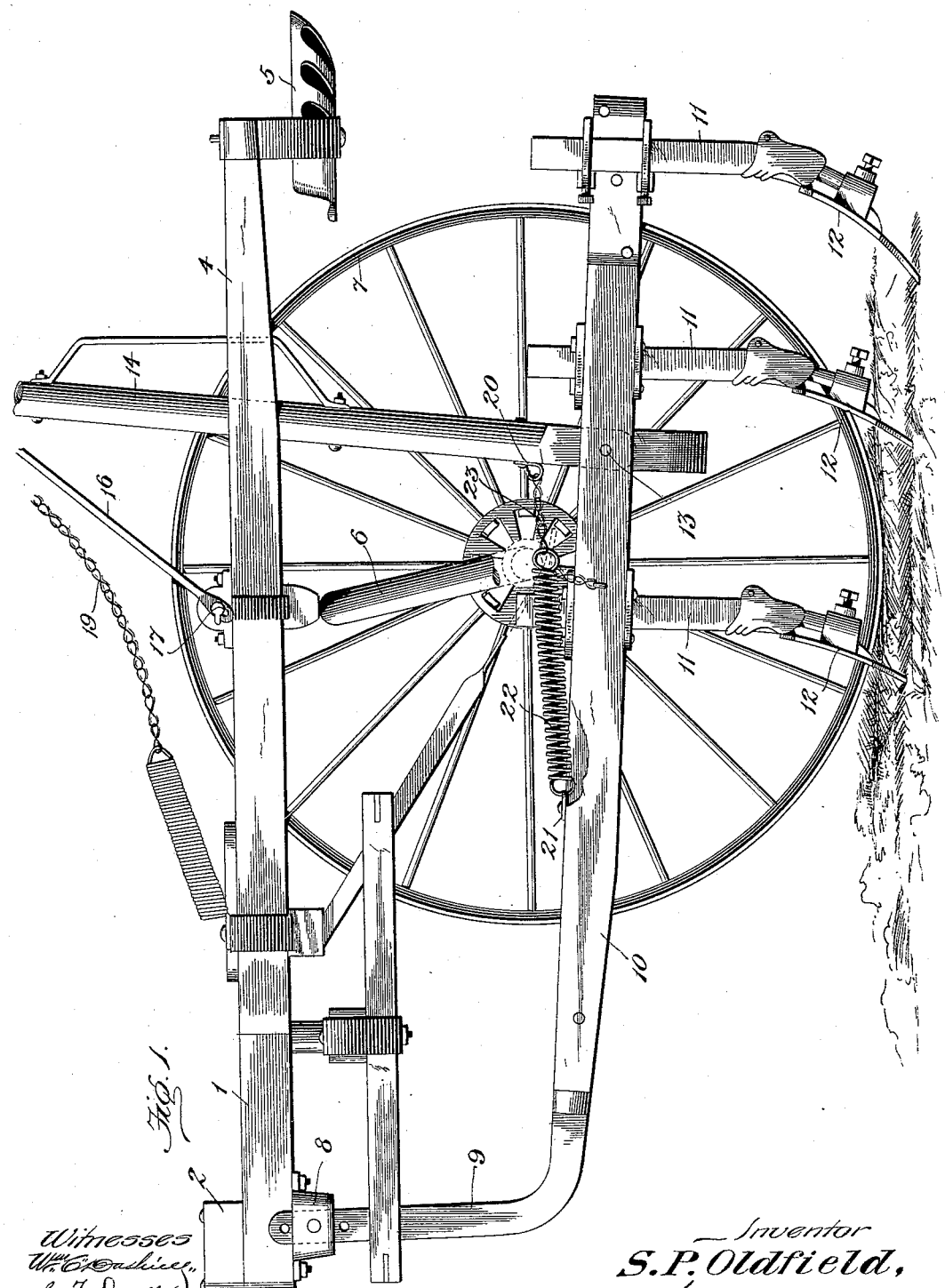

(No Model.) 2 Sheets—Sheet 1.

S. P. OLDFIELD.
LIFTING SPRING FOR CULTIVATORS.

No. 579,720. Patented Mar. 30, 1897.

Witnesses
Wm. C. Cashiell
C. F. Duvall

Inventor
S. P. Oldfield,
By W. J. Duvall
Atty.

THE NORRIS PETERS CO., PHOTO-LITHO., WASHINGTON, D. C.

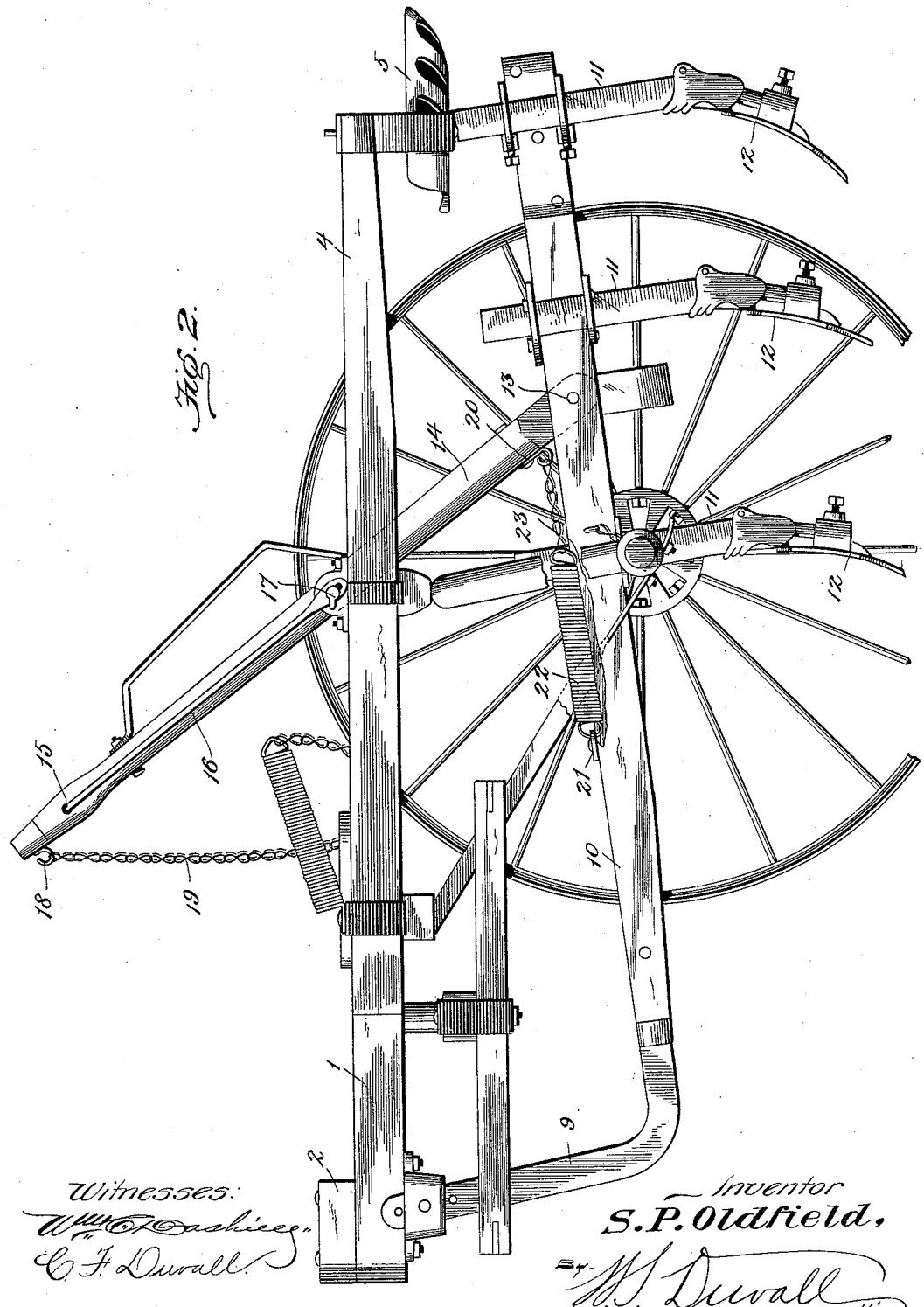

UNITED STATES PATENT OFFICE.

SILAS P. OLDFIELD, OF MITCHELLVILLE, IOWA, ASSIGNOR TO THE OHIO CULTIVATOR COMPANY, OF BELLEVUE, OHIO.

LIFTING-SPRING FOR CULTIVATORS.

SPECIFICATION forming part of Letters Patent No. 579,720, dated March 30, 1897.

Application filed May 18, 1896. Serial No. 591,989. (No model.)

*To all whom it may concern:*

Be it known that I, SILAS P. OLDFIELD, a citizen of the United States, residing at Mitchellville, in the county of Polk and State of Iowa, have invented certain new and useful Improvements in Lifting-Springs for Cultivators; and I do hereby declare the following to be a full, clear, and exact description of the invention, such as will enable others skilled in the art to which it appertains to make and use the same.

My invention relates to improvements in cultivators, but has special reference to certain new and useful improvements in that construction of cultivator covered by United States Patent No. 373,963, granted to Martin Bruner, Jr., November 29, 1887.

The patent referred to covers a construction of cultivator that employs a pair of frame-bars that are mounted upon an arched axle, at the ends of which are journaled the ground-wheels, a pair of divergent beams being loosely coupled to the front ends of the frame-bars at each side and provided with a series of cultivator teeth or shovels. Supported upon the framework in a pivotal manner are pairs of inverted elongated U-shaped standards, whose upper ends are loosely connected to a pair of opposite hand-levers, the lower ends of which are pivotally connected between each pair of divergent beams. It will be observed that the fulcrums of the levers are arranged eccentrically with relation to the pivotal point of connection between the lower ends of the levers and the beams, so that by throwing the levers forward they also serve to simultaneously raise the beam from the soil and bring them to such a height as will render the cultivator teeth or shovels inoperative. The advantages arising from such a construction are practical and manifest; but in practice I have found that the frequent necessity for raising the beams, as when turning the machine or for the purpose of clearing a stump or ridding the cultivator-teeth of accumulated trash, causes the work to become irksome and also attracts the attention of the driver to such an extent as to prevent him from paying that attention to his team as is required, particularly at a turning-point in the field.

The objects, therefore, of my invention are to produce a means for materially aiding the driver in throwing the levers to the front, so that a slight touch given by him to the levers will suffice, leaving him free to handle his lines and govern his team; to so arrange such means as not to interfere with the penetration of the teeth in the soil, and, finally, to accomplish the objects in view in such a simple manner as not to complicate the machine or materially increase the cost of manufacture.

Referring to the drawings, Figure 1 is a side elevation of a cultivator constructed as described in the patent referred to and provided with my improvement, the wheel at the near side being removed for the purpose of exposing the parts and the cultivator-teeth being shown in their lowered operative position. Fig. 2 is a similar view with the teeth elevated, as for clearing the same of trash, avoiding a stump or other obstruction, or turning at the end of a furrow.

Like numerals of reference indicate like parts in both figures of the drawings.

Previous to beginning a detail description of my invention I will briefly designate the parts composing the cultivator referred to.

1 designates the frame-bars, located at opposite sides of the machine and connected at their front ends by the cross-piece 2. Adjustably connected to the frame-bars 1 by means of clips 3 are the seat-bars 4, from the rear ends of which are supported the seat 5 for the accommodation of the driver. The frame-bars 1 are supported at each side of the center upon the arched axle 6, at the extremities of which the ground-wheels 7 are journaled. Adjustably and pivotally connected to the front ends of the frame-bars 1 by means of couplings 8 are shank-irons 9, and to the lower end of each shank-iron there is rigidly connected a pair of divergent beams 10, each pair of beams having secured thereto and depending therefrom cultivator-standards 11, that support teeth or shovels 12. Pivotally connected between the divergent beams at each side of the machine, as indicated at 13, is the lower end of a swinging hand-lever 14, said hand-levers projecting upwardly between the frame-bars 1 in front and at opposite sides of the centrally-located seat for the driver. The upper ends of the hand-levers are loosely connected, as at 15, to the upper transverse bearing portions of a pair of elongated inverted-U-shaped standards 16, whose lower ends are loosely pivoted, as at 17, to the framework. A hook 18 is located at the upper end of each hand-lever, and a chain 19 is adjustably connected with the hook and at its opposite end to the framework, the object and purpose of the chain being to limit the depression or depth of penetration of the shovels.

Thus far I have described in detail the cultivator referred to and to which my invention is applicable, and I will now proceed to describe my invention.

To the front face of each of the hand-levers 14, at a point slightly above its pivotal point of connection 13 with the cultivator-beam, I secure a hook-plate 20. In advance of this point upon the beams 10 I locate an eye-plate 21. To this eye-plate 21 I connect a coil-spring 22, the opposite end of said spring being preferably connected to a short chain 23, any one of the links of which may be engaged with the hook-plate 20. It will be understood that each of the hand-levers is thus provided, so that each of the hand-levers may be operated independent of the other.

It will be observed that the fulcrum of each hand-lever is the point of pivotal connection between the upper end of the supporting-standard 16 and the same, so that when the hand-lever is swung to the rear and lowers, so as to drop the cultivator-teeth into the soil, the spring 22 becomes distended and lies more nearly parallel with the standard 16, and therefore is not of sufficient strength to draw the standard to the front and raise the beam. By exerting or imparting to the hand-lever a slight push, however, the hand-lever and its supporting-standard 16 assumes more nearly a vertical position, and as it reaches such position the spring begins to act and finally results in drawing the hand-lever to the front, and thus raising the beams to which it is attached and the teeth carried thereby. I thus avoid the necessity of the operator reaching down and grasping one or both levers and following them with his hands nearly throughout the arc of the circle which their ends describe, and accomplish with a minimum amount of labor and power resulting from a light upward push a positive immediate raising of the cultivator teeth or shovels for any purpose whatever. It will be observed that the relative location of these springs with relation to the peculiar manner of fulcruming the hand-levers and their location results in an inactivity upon the part of the springs when the levers are swung to the rear and the beams lowered, and that their power is only invoked by an initial though slight upward push imparted to said hand-levers. It will also be observed that the addition of this spring, while not complicating the mechanism, furthermore does not materially increase the cost of the cultivator, and may be applied to those in use without any alteration whatever just as well and as readily as those being manufactured.

Having described my invention, what I claim is—

In a cultivator, the combination with the framework and supporting-axle and wheels, of cultivator-beams located below the framework, hand-levers pivoted to the beams, standards fulcrumed on the framework in advance of the point of pivot between the beams and hand-levers and loosely connected at their upper ends to the hand-levers, and springs for drawing the levers to the front and raising the beams, said springs being connected to the hand-levers and beams and arranged with relation to the standards to exert an increasing power upon the hand-levers after the initial push imparted to the same, substantially as specified.

In testimony whereof I affix my signature in presence of two witnesses.

SILAS P. OLDFIELD.

Witnesses:
G. T. SWEARINGEN,
J. W. McCURNIN.